M. A. REPLOGLE.
BUFFER FOR TIRES.
APPLICATION FILED JULY 28, 1919.
1,426,910.
Patented Aug. 22, 1922.
2 SHEETS—SHEET 2.
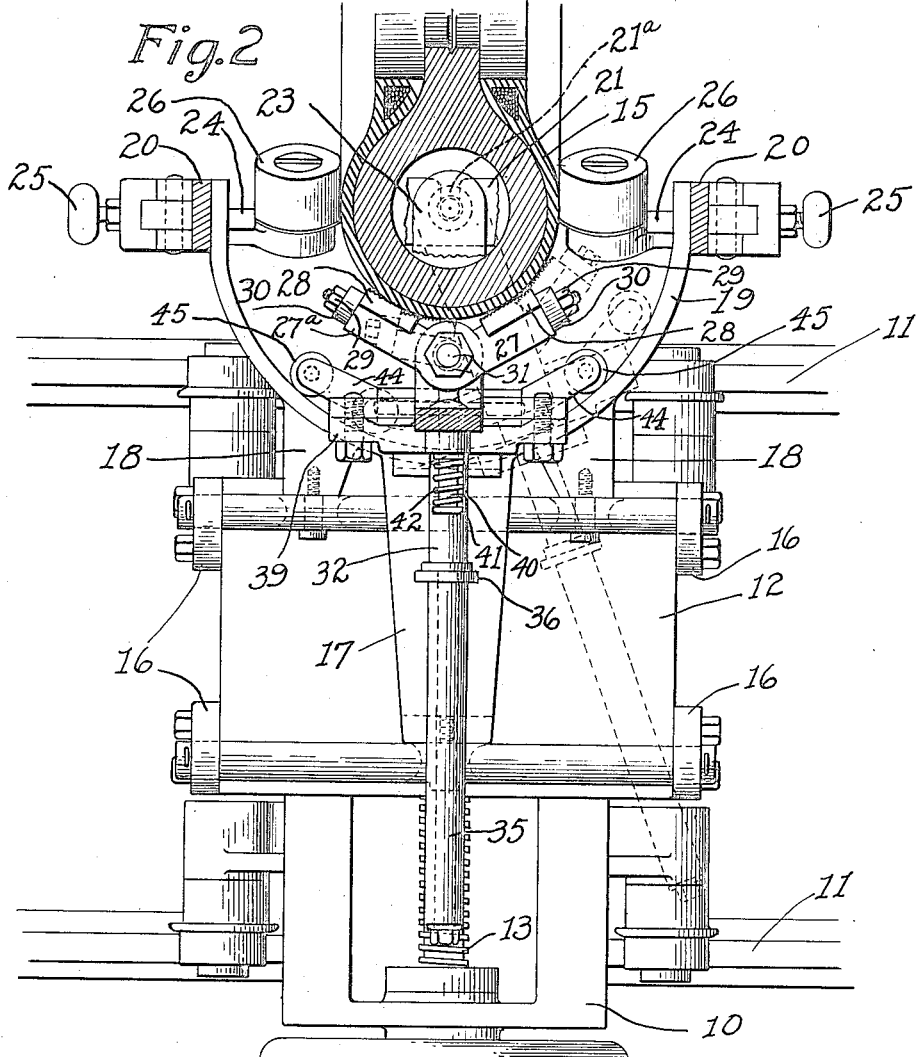
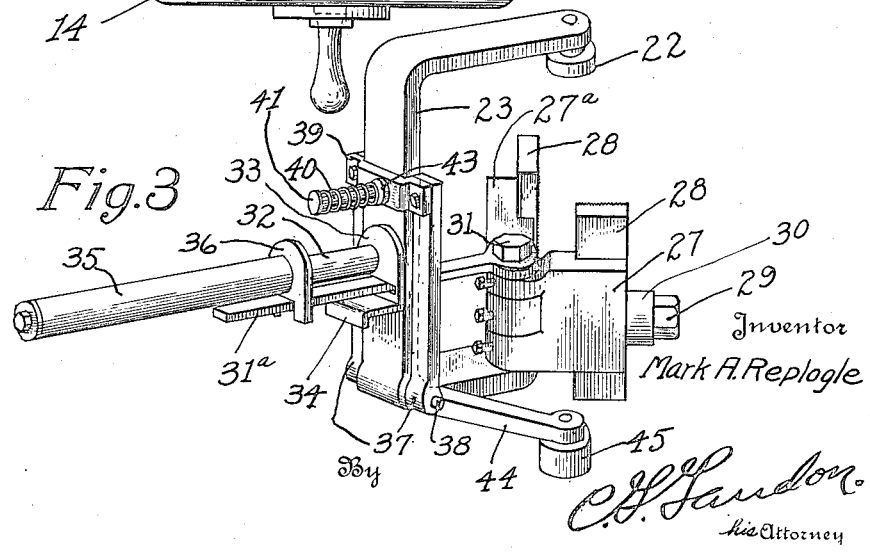
Inventor
Mark A. Replogle
By C. H. Landon
his Attorney

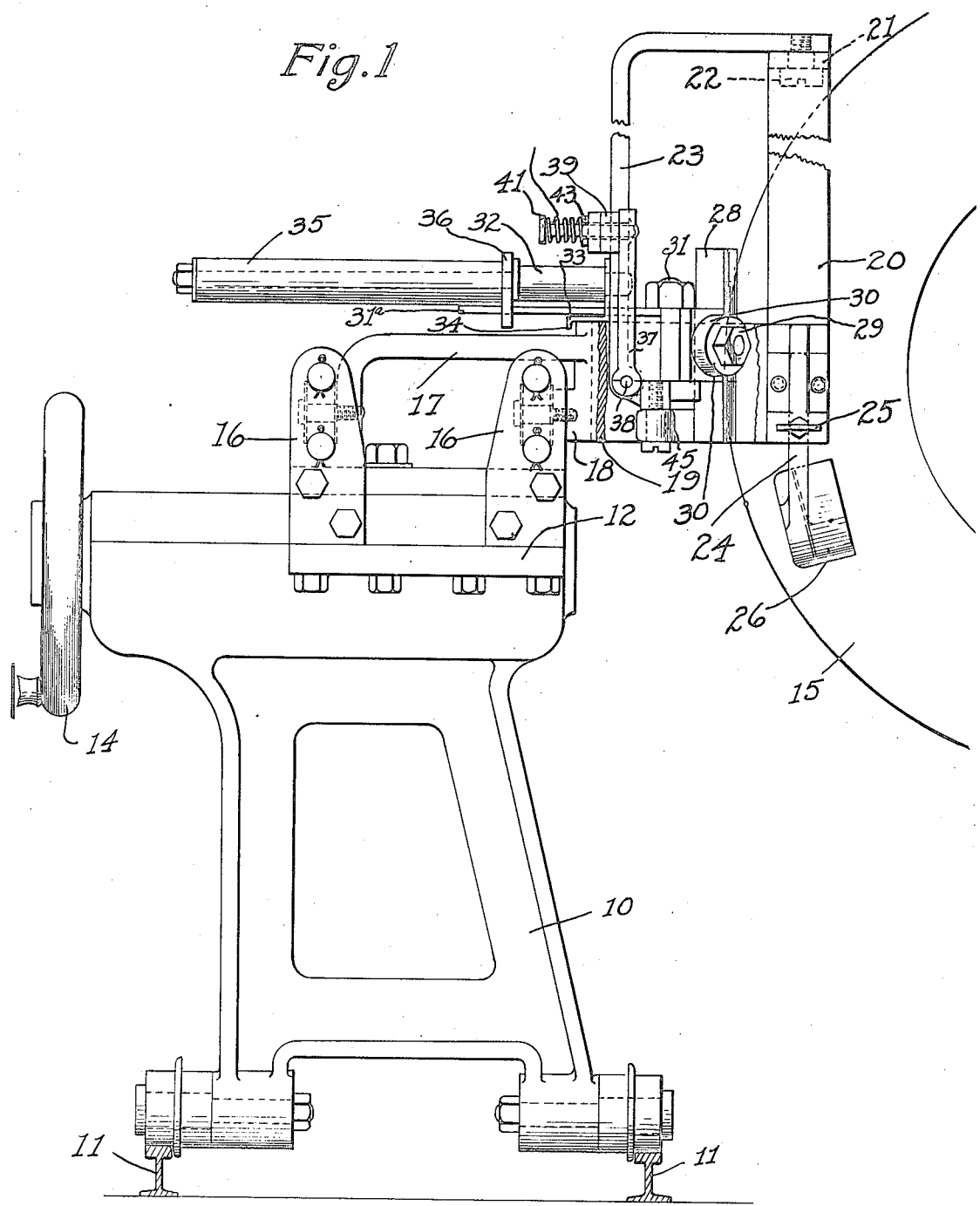

UNITED STATES PATENT OFFICE.

MARK A. REPLOGLE, OF AKRON, OHIO, ASSIGNOR TO THE GOODYEAR TIRE & RUBBER COMPANY, OF AKRON, OHIO, A CORPORATION OF OHIO.

BUFFER FOR TIRES.

1,426,910.  Specification of Letters Patent.  Patented Aug. 22, 1922.

Application filed July 28, 1919. Serial No. 313,908.

*To all whom it may concern:*

Be it known that I, MARK A. REPLOGLE, a citizen of the United States, and resident of Akron, in the county of Summit and State of Ohio, have invented new and useful Improvements in Buffers for Tires, of which the following is a specification.

My invention relates to a buffer for tires, more especially pneumatic tires, for the purpose of buffing or roughening the surface thereof in order to more efficiently cement a "tread" thereto.

Hitherto it has been customary in roughening or buffing a portion of the surface of a pneumatic tire, to suitably prepare it for the tread, or undertread as the case may be, for an operator to hold a rasp against the surface of the tire, by having the rasp mounted on some suitable implement. This method like many hand methods is objectionable for several reasons; it is difficult, fatiguing, comparatively slow, is not uniform, and may result in injury to the tire carcass or the operator.

It is, therefore, the primary object of my invention to provide a machine which shall not only avoid the objections just referred to and by a simple and speedy operation buff the tires in a uniform manner, but also one which may be readily moved from one tire supporting and rotating machine to another.

It is a further object of my invention to provide a portable mechanical buffer for tires which is capable of adjustment in several respects, so as to buff the desired portions of the tire surface and to the desired degree.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which similar reference numbers designate corresponding parts:

Figure 1 is a side elevation of an apparatus constructed in accordance with my invention;

Figure 2 is a plan view thereof showing the tire in section; and

Figure 3 is a detail in perspective showing the adjustable buffer mechanism.

A portable carriage base 10, adapted to ride on floor rails 11, by the provision of wheels or rollers or any other suitable means, supports an adjustable, slidably mounted carriage 12. The adjustment of the carriage 12 may be effected by a screw 13, having at its end a hand wheel 14. As the hand wheel 14 is turned the carriage is adjusted toward or away from the tire 15, which is supported and rotated by any desired mechanism (not shown).

The carriage 12 has bolted thereto two pairs of upstanding brackets 16 which support, by means of an arm 17 and lugs 18, an arcuate guide 19 formed integral with the arm 17 and lugs 18. Preferably the arm 17 is provided with rollers 17$^a$ that are mounted between guides 18$^a$, to permit adjustment of the arm 17 transversely of the carriage 12. This arcuate guide 19 constitutes a support for the buffer mechanism, and carries at the ends thereof a support 20 in the form of an inverted U, the cross-piece 21 connecting the two legs of the U at their upper ends, being suitably notched as indicated at 21$^a$ to loosely receive the shank of a downwardly turned stud 22 of an element 23, also U shaped (see Figure 3). The stud 22 and the notch 21$^a$ in which it loosely fits, serve as a pivot, in the nature of a universal joint, by which the element 23 is suspended and about which it may be swung, as indicated by the dotted lines in Figure 2. It will be understood that any suitable means may be provided for suspending the element 23.

The ends of the arcuate element 19 also carry, by means of the arms 24, secured thereto by set screws 25, rollers 26, which serve to guide the tire 15 therebetween and to prevent it from wobbling during the buffing thereof.

Referring to Figure 3, it will be seen that the base of the element 23 has pivotally mounted thereon two adjustable rasp or buffer supports 27 and 27$^a$, on the inner surfaces of which rasps 28 or other suitable buffers, are secured by any desired means such as nuts 29 operating to cause washers 30 to bind the rasps in place. As will be noted, each rasp or buffer has a substantially flat operating surface, which contacts with tire periphery at but one point.

While I have shown as buffers, rasps 28 which are file-like in their nature, it is to be noted that it is not essential that the buffers be of a rough surface, inasmuch as smooth buffers would produce the same result in a somewhat longer time, for the heat generated by the friction, causes the rubber of the tire to soften and be roughened even by a comparatively smooth surface.

A pivot pin 31 has secured thereto a horizontal arm 31ª, which passes through a relatively wide slot in the element 23, thus permitting a slight turning of the rasp supports 27 and 27ª. These latter supports are affixed to said pivot 31 by means of set screws, as shown and are therefore adjustable with relation to each other. By means of the turning movement of the rasp supports that is accomplished through the lever 31ª, the operator is enabled to increase the pressure of either one of the rasps 28 upon the tire at will.

A horizontal arm 32 is carried by the element 23 and serves to secure to the outside thereof a supporting guide 33, having a flange 34 adapted to ride over the upper edge of the arcuate element 19.

A turnable sleeve 35 is loosely mounted on the arm 32 and has secured thereto a forked member 36, the forks of which engage the arm 31ª on either side thereof so that upon turning the sleeve 35 on the arm 32, the arm 31ª will turn the pin 31 and the rasp supports 27 and 27ª slightly, to cause one of the rasps to engage the tire with more pressure than the other.

A pair of bell-crank levers 37 are arranged on either side of the vertical portion of the U shaped element 23, and are mounted on a pin 38 to permit a slight rocking of the levers about the pin 38 as an axis. The upper arms of the levers 37 are connected by a cross-bar 39, having a hole, through which a post 40 secured to the element 23 extends outwardly, the end of the post having a head 41 against which one end of a coil spring 42 impinges. The other end of the spring 42 engages a lug 43 about the hole in the cross-bar 39. As will be obvious from an inspection of Figure 3, the spring 42 normally holds the cross-bar 39 against the upright portion of the element 23. The lower arms 44 of the bell-cranks 37 carry depending rollers 45 which serve as bearings and are held against the inner surface of the arcuate element 19, by the action of the spring 42. The spring 42 therefore lends a certain resiliency to the device permitting the element 23 to swing slightly in a vertical plane, without the rollers 45 binding, and thus compensate for any irregularities of the tire or its mounting.

In operation the carriage base 10 is moved along on the rails 11 until it has reached its proper position opposite a tire mounted on a tire supporting and rotating machine.

The carriage 12 is then adjusted by means of the hand wheel 14 until the rasps or buffer elements 28 impinge upon the surface of the rotating tire. The buffers, having flat surfaces, engage the tire at a tangent thereto, and at two different points and are preferably so related with respect to each other that any one portion of the tire surface cannot be twice buffed. By swinging the element 23 about its point of suspension or pivot—the stud 22—every required portion of the tire surface may be buffed. To buff off any ridge or unduly thick portion of the periphery, the operator may twist the sleeve 35, thus rocking the arm 31 to cause one of the buffer elements to press with greater force against the tire than the other.

The resiliently mounted bell-crank levers 37 are allowed slight movement to compensate for unevenness of the tire surface, or for untrueness in mounting.

While I have shown and described the preferred embodiment of my invention, it will be understood that such modifications and changes may be made as come within the scope of the appended claims without in any way departing from the spirit of the invention as defined thereby.

What I claim is:

1. A tire buffing machine comprising, a base member, a carriage mounted thereon for movement toward or away from the tire, a support movable transversely of the carriage and adapted to be positioned in proximity to the tire, and buffer devices yieldably mounted upon the support and adapted to engage the tire periphery.

2. A tire buffing machine comprising, a base member, a carriage mounted thereon for movement toward or away from the tire, a support movable transversely of the carriage and adapted to be positioned in proximity to the tire, buffer devices yieldably mounted upon the support and adapted to engage the tire periphery, and means whereby the buffer devices may be moved transversely of the tire periphery.

3. A tire buffing machine comprising, a base member, a carriage mounted thereon for movement toward or away from the tire, a support movable transversely of the carriage and adapted to be positioned in proximity to the tire, buffer devices yieldably mounted upon the support and adapted to engage the tire periphery, and means whereby the support may be properly positioned relatively to the tire.

4. A tire buffing machine comprising, a base member, a carriage mounted thereon for movement toward or away from the tire, buffer devices mounted upon the carriage and adapted to engage the tire periphery, and means whereby the buffer devices may be moved transversely of the tire periphery.

5. A tire buffing machine comprising, a base member, a carriage mounted thereon for movement toward or away from the tire, buffer devices mounted upon the carriage and adapted to engage the tire periphery, and means whereby the buffer devices may be selectively adjusted against the face of the tire.

6. A tire buffing machine comprising, a base member, a carriage mounted thereon for movement toward or away from the tire, buffer devices yieldably mounted upon the carriage and adapted to engage the tire periphery, and means whereby the buffer devices may be adjusted in a path conforming to the transverse contour of the tire periphery.

7. A tire buffing apparatus having a support, a frame slidably adjustable on said support, an element pivotally mounted on said frame, a buffer carried by said element, means whereby said element may be turned about its pivot to engage different zones of the tire to be buffed.

8. A tire buffing apparatus having a support, a frame mounted on said support, an element pivotally carried by said frame, an arcuate element serving as a guide for said pivoted element when said pivoted element is swung about its pivot, said pivoted element carrying a buffer adapted to be impinged against the surface of the tire, and means whereby said pivoted element may be swung about its pivot.

9. A tire buffing machine comprising, a base member, a carriage mounted thereon for movement toward or away from the tire, buffer devices yieldably suspended from the carriage and adapted to engage the tire periphery, and means whereby the buffer devices may be moved transversely of the tire periphery in a curvilinear path.

10. A tire buffing machine comprising, a base member, a carriage mounted thereon for movement toward or away from the tire, a support movable transversely of the carriage and adapted to be positioned in proximity to the tire, buffer devices yieldably suspended from the support and adapted to engage the tire periphery, and means whereby the buffer devices may be adjusted in a path conforming to the transverse contour of the tire periphery.

11. A tire buffing machine comprising, a base member, a carriage mounted thereon for movement toward or away from the tire, buffer devices yieldably mounted upon the carriage and adapted to engage the tire periphery, means whereby the buffer devices may be adjusted in a path conforming to the transverse contour of the tire periphery, and means whereby the buffer devices may be selectively adjusted against the face of the tire.

12. A tire buffing machine comprising, a base member, a carriage mounted thereon for movement toward or away from the tire, a support movable transversely of the carriage and adapted to be positioned in proximity to the tire, buffer devices yieldably mounted upon the support and adapted to engage the tire periphery, and means whereby the support is properly positioned relatively to the tire.

13. An apparatus for buffing tires, comprising a support, an arcuate element carried by said support, means secured to said arcuate element and from which a second element, guided by said arcuate element, is loosely suspended, a buffer support mounted on said second element, a buffer carried thereby, and manually operated means for moving said second element about its point of suspension, whereby said buffer is brought into engagement with different portions of said tire.

14. A base member, a carriage mounted thereon for movement toward or away from the tire, a support movable transversely of the carriage and adapted to be positioned in proximity to the tire, buffer devices yieldably mounted upon the support and adapted to engage the tire periphery, means whereby the support is properly positioned relatively to the tire, means whereby the buffer devices may be adjusted in a path conforming to the transverse contour of the tire periphery, and means whereby the buffer devices may be selectively adjusted against the face of the tire.

15. An apparatus for buffing tires, comprising a support, an arcuate element carried by said support, means secured to said arcuate element and from which a second element, guided by said arcuate element, is loosely suspended, a buffer support mounted on said second element, a buffer carried thereby, and a handle for moving said second element about its point of suspension, whereby said buffer is brought into engagement with different portions of said tire.

16. An apparatus for buffing tires, comprising a support, an arcuate element carried by said support, means secured to said arcuate element and from which a second element, guided by said arcuate element, is loosely suspended, a buffer support pivotally mounted on said second element, a buffer carried thereby, and manually operated means for moving said second element about its point of suspension, whereby said buffer is brought into engagement with different portions of said tire.

17. An apparatus for buffing tires, comprising a support, an arcuate element carried by said support, means secured to said arcuate element and from which a second element, guided by said arcuate element, is loosely suspended, a buffer support pivotally mounted on said second element, buffers carried by said buffer support, means for moving said second element about its point of suspension, whereby said buffers are brought into engagement with different portions of the tire, and means whereby said buffer support may be independently turned about its pivot, whereby one buffer bears with greater pressure against the tire than the other.

18. An apparatus for buffing tires, comprising a support, an arcuate element carried by said support, means secured to said arcuate element and from which a second element, guided by said arcuate element, is loosely suspended, a buffer support pivotally mounted on said second element, buffers carried by said buffer support, a handle secured to said second element for moving said second element about its point of suspension whereby said buffers are brought into engagement with different portions of the tire, a sleeve on said handle and carrying a forked member, an arm secured to said buffer support and adapted to be operated by engagement therewith of the forks of said forked member, whereby upon the twisting of said sleeve said buffer support is turned upon its pivot to cause one buffer to bear with greater pressure against the tire than the other.

In witness whereof, I have hereunto signed my name in the presence of two subscribing witnesses.

MARK A. REPLOGLE.

Witnesses:
JOHN E. KEATING,
L. M. HARTMAN.